US010062469B2

(12) United States Patent
Goela et al.

(10) Patent No.: US 10,062,469 B2
(45) Date of Patent: Aug. 28, 2018

(54) TRANSPARENT CONDUCTIVE ARTICLES

(75) Inventors: Jitendra S. Goela, Andover, MA (US); Nathaniel E. Brese, Hopkinton, MA (US)

(73) Assignee: Rohm and Haas Electronic Materials LLC, Marlborough, MA (US)

( * ) Notice: Subject to any disclaimer, the term of this patent is extended or adjusted under 35 U.S.C. 154(b) by 1258 days.

(21) Appl. No.: 13/540,315

(22) Filed: Jul. 2, 2012

(65) Prior Publication Data

US 2013/0171452 A1 Jul. 4, 2013

Related U.S. Application Data

(60) Provisional application No. 61/503,448, filed on Jun. 30, 2011.

(51) Int. Cl.
*B32B 9/00* (2006.01)
*H01B 1/06* (2006.01)
*H01B 1/04* (2006.01)

(52) U.S. Cl.
CPC ................. *H01B 1/06* (2013.01); *H01B 1/04* (2013.01); *Y10T 428/30* (2015.01)

(58) Field of Classification Search
CPC . C01B 31/0438; C01B 2204/00; B32B 9/007; C23C 16/26; Y10T 428/30
USPC ........................... 428/408; 423/448; 252/500
See application file for complete search history.

(56) References Cited

U.S. PATENT DOCUMENTS

| | | | |
|---|---|---|---|
| 5,604,151 A | 2/1997 | Goela et al. | |
| 6,221,482 B1 | 4/2001 | Goela | |
| 6,228,297 B1 | 5/2001 | Goela et al. | |
| 7,354,988 B2 | 4/2008 | Charati et al. | |
| 7,442,358 B2 | 10/2008 | Sano et al. | |
| 7,449,133 B2 | 11/2008 | Gruner et al. | |
| 7,785,557 B2 | 8/2010 | Gruner et al. | |
| 7,790,242 B1 | 9/2010 | Sumanasekera et al. | |
| 7,897,876 B2 | 3/2011 | Tsotsis et al. | |
| 7,951,513 B2 | 5/2011 | Kubota et al. | |
| 8,334,493 B2 | 12/2012 | Yokogawa | |
| 8,431,103 B2 | 4/2013 | Song et al. | |
| 9,073,781 B2 | 7/2015 | Nadaud et al. | |
| 2001/0037935 A1 | 11/2001 | Oya et al. | |
| 2007/0284557 A1 | 12/2007 | Gruner et al. | |
| 2009/0061254 A1 | 3/2009 | Goela et al. | |
| 2010/0079842 A1 | 4/2010 | Dunleavy et al. | |
| 2010/0304131 A1 | 12/2010 | Okai et al. | |
| 2011/0070146 A1 | 3/2011 | Song et al. | |
| 2011/0117361 A1 | 5/2011 | Hamilton et al. | |
| 2011/0127471 A1 | 6/2011 | Shin et al. | |
| 2011/0133134 A1 | 6/2011 | Varma et al. | |
| 2011/0198313 A1* | 8/2011 | Baraton .............. | C23C 16/0281 216/13 |
| 2011/0269629 A1* | 11/2011 | Giustino ................ | B82Y 30/00 505/100 |
| 2011/0281070 A1* | 11/2011 | Mittal ............... | H01L 31/02246 428/142 |
| 2012/0161106 A1* | 6/2012 | Kim .................. | H01L 31/03520 257/29 |
| 2012/0241199 A1 | 9/2012 | Kobayashi et al. | |

FOREIGN PATENT DOCUMENTS

| | | |
|---|---|---|
| CN | 101696002 | 4/2010 |
| CN | 101859858 | 10/2010 |
| WO | 2009089268 | 7/2009 |
| WO | 2011016832 | 2/2011 |
| WO | 2011075158 | 6/2011 |
| WO | 20120064285 | 5/2012 |

OTHER PUBLICATIONS http://en.wikipedia.org/wiki/Graphene; Graphene from Wikipedia Encyclopedia.
Search Report from corresponding Japanese Application No. 2012-147063, dated Jun. 20, 2016.
Search Report from corresponding China Application No. 201210324095, dated Apr. 14, 2014.
Search report from corresponding European Application No. 102112052, dated Dec. 19, 2012.

* cited by examiner

*Primary Examiner* — Daniel H Miller
(74) *Attorney, Agent, or Firm* — John J. Piskorski

(57) ABSTRACT

Articles with graphene are selectively transparent to electromagnetic radiation. The articles transmit electromagnetic radiation in the infrared and visible light bands while inhibiting incident radio frequency radiation. The articles have high electrical conductivity and may be used in windows and domes.

8 Claims, No Drawings

TRANSPARENT CONDUCTIVE ARTICLES

This application claims the benefit of priority under 35 U.S.C. § 119(e) to U.S. Provisional Application No. 61/503,448, filed Jun. 30, 2011, the entire contents of which application are incorporated herein by reference.

The present invention is directed to transparent conductive articles which transmit in the infra-red and visible regions of the electromagnetic spectrum and inhibit incident radio frequency radiation. More specifically, the present invention is directed to transparent conductive articles which transmit in the infra-red and visible regions of the electromagnetic spectrum and inhibit incident radio frequency radiation and have high electrical conductivity.

There are many applications where an infra-red and visible light transparent material is positioned in an optical path of electro-optic equipment to protect the equipment during use. Such material is typically a window or in the shape of a dome. Infra-red window and dome materials such as zinc sulfide, zinc selenide, spinel, aluminum oxynitride and sapphire have excellent transmission in the visible and infra-red regions and are used to protect the electro-optical equipment on various aeronautical, terrestrial and aquatic vehicles. However, these optical materials are also electrical insulators which make them susceptible to electromagnetic interference and detection by return signals in the radio frequency band of 2-18 GHz. If the infrared optical material or the window surface facing the outside environment is rendered electrically conducting, the issues of interference and detection by return signals in the radio frequency band can be addressed. This places stringent design criteria on the optical material such that it transmits in the infra-red and also the visible spectral bands but does not transmit radio frequencies such as microwave radiation.

In one method typically used to provide low radio frequency transmission, a metal mesh or grid can be applied to the surface of a material such as a window or dome. However, the metal mesh degrades the optical transmission of the material, creating opaque areas; furthermore, the metal can react with or diffuse into the material to further degrade the optical performance and may also affect other properties. In addition, if the metal grid is exposed to rain or a blowing-sand environment, it can deflect water droplets or sand particles and thus accelerate abrasion of the window. When the optical path is at an angle to the material normal, the grids produce shadows which further increase the transmission loss.

In some applications such as electro-optic sensors, fine metal grids are applied close to the surface of zinc sulfide windows to reflect microwave radiation. The bulk zinc sulfide windows are manufactured by chemical vapor deposition, and the conductive grids are then produced by physical vapor deposition processes such as sputtering and electron beam evaporation. It is difficult to ensure uniformity of the metal grids particularly on large or curved areas. In addition there is also a high risk of environmental damage to the shielding metal grids. Encapsulation of the reflective grids by overgrowing with zinc sulfide may circumvent the problems of environmental degradation, but this approach also requires additional post-fabrication machining.

U.S. 2010/0079842 published patent application discloses electro-optic windows which are made of materials which are substantially transparent to infrared radiation and visible radiation and have reduced radio frequency transmission. The materials selectively transmit radiation due to carbon nanotubes in the materials. However, such nanotubes typically do not readily align in parallel to form flat layers.

Instead they tend to form an irregular array where the ends of one tube make contact along the length of another tube or tend to form aggregates of irregularly orientated nanotubes. This irregular orientation of the carbon nanotubes tends to reduce the overall electrical conductivity of materials which include them. Accordingly, there is a need for materials which are substantially transparent to infrared and visible radiation, inhibit incident radio frequency radiation and have improved electrical conductivity.

Articles include one or more layers of graphene, the articles transmit in the infrared and visible regions of the electromagnetic spectrum and inhibit incident radio frequency radiation.

Methods include providing an optical material substrate; and contacting one or more layers of graphene on the optical material substrate to form an article with transmission of infrared and visible radiation and inhibit incident radio frequency radiation.

In addition to providing articles which transmit in the infrared and visible regions of the electromagnetic spectrum and inhibit incident radio frequencies, the articles have increased electrical conductivity over many conventional articles having similar selective transmission properties. The relatively high electrical conductivity in the articles facilitates ice removal when they are operated in cold environments. The articles provide good electrical continuity between airframe and other surrounding structures. The articles also have reduced susceptibility to environmental damage. Graphene films have high thermal conductivity. Accordingly, articles made with graphene layers near their surfaces or distributed throughout the articles can be used in high thermal shock environments to dissipate heat to the edges.

As used throughout this specification, the following abbreviations shall have the following meanings, unless the context indicates otherwise: ° C.=degrees Centigrade; μm=microns=micrometers; m=meters; cm=centimeter; nm=nanometers; CVD=chemical vapor deposition; PVD=physical vapor deposition; sccm=standard cubic centimeters per minute; slpm=standard liters per minute; L=liters; Hz=hertz; GHz=gigahertz; kHz=kilohertz; W=Watt; V=volts; s=seconds; K=degrees Kelvin; GPa=gigapascals; 1 atmosphere=760 torr; 1 atmosphere=$1.01325\times10^6$ dynes/$cm^2$; psi=pounds per square inch; 1 atmosphere=14.7 psi; Ksi=kilo-pounds per square inch; J=joules; IR=infrared; UV=ultra-violet; rpm=revolutions per minute; cP=centipoises and ASTM=American Standard Testing Method.

All percentages are by weight unless otherwise noted. All numerical ranges are inclusive and combinable in any order, except where it is logical that such numerical ranges are constrained to add up to 100%.

Graphene is a two dimensional sheet of carbon atoms packed in a honey comb lattice which possesses transmission in the IR and visible ranges with minimal to no transmission of radio frequency radiation. Graphene is inert to many optical materials. Graphene may be incorporated into the optical material or deposited onto the optical material in the form of surface coatings. When graphene is incorporated into the optical material it may be dispersed as particles or flakes throughout the material. When graphene is deposited on an optical material as a surface coating it may form a single layer on the optical material or form one or more alternating layers with one or more layers of optical materials in a multilayer article. The graphene layers may be applied in the form of a mat or as a solution or dispersion of particles or flakes. The mat may be perforated or otherwise provided with an array of holes to increase the IR and visible transmission while retaining the low radio frequency transmission characteristics. The mat may have a pattern of holes formed in it by a laser. This may be done using pulsed lasers such as excimer lasers at 193 nm or 248 nm. Individual holes may be drilled using the focused laser beam or use a mask and large beam footprint to produce a plurality of holes simultaneously. Multiple pulses are used with a pulse rate of 20-60 Hz with a pulse energy of 0.5-1.5 J/pulse. The articles which include graphene transmit electromagnetic radiation in the infrared and visible regions while inhibiting incident radio frequency radiation. The graphene layers may yield a sheet resistance of 20 ohms/square or less with transmission @ 550 nm of 91%.

Optical materials include materials transparent to both IR radiation and visible radiation. The optical materials may have various forms and shapes. Typically they are in the form of a window or dome. Typically the windows and domes have a thickness of 2-30 mm or such as from 2.5-25 mm. Typically such materials include a crystalline material or a glass material. Such materials include, but are not limited to, zinc selenide, zinc sulfide, multi-spectral zinc sulfide and water clear zinc sulfide, CdTe, chalcogenide glasses, $MgF_2$, $CaF_2$, $BaF_2$, KCl, AgCl, KBr, CsBr, Csl, KRS5 (thallium bromoiodide optical crystal), $SiO_2$, silicate glass, aluminate glass, quartz, $Al_2O_3$, sapphire, aluminum oxynitirde, spinel, Si, Ge, GaAs; calcium aluminate glasses, germinate glasses, fluoride glasses; $MgF_2$, $CaF_2$, MgO hot pressed ceramics; $MgF_2$, $CaF_2$, $SrF_2$, $BaF_2$ melt grown fluorides constituents of glasses; diamond, and processed borosilicate. Many of these materials are commercially available or may be made according to various methods known in the literature. Examples of conventional methods of making optical materials, such as zinc sulfide, water clear zinc sulfide, zinc selenide and spinel are disclosed in U.S. Pat. No. 6,042,758, U.S. Pat. No. 6,221,482, U.S. Pat. No. 6,472,057 and U.S. 2009/0061254. Examples of commercially available crystalline optical materials are CVD ZINC SULFIDE™, CVD ZINC SELENIDE™, CLEARTRAN™ water clear zinc sulfide and TUFTRAN™ zinc sulfide/zinc selenide laminate, all available from Rohm and Haas Electronic Materials, LLC, Marlborough, Mass. Examples of other commercially available crystalline or glass optical materials are ALON™ aluminum oxynitride, Techspec® Sapphire and VOCOR™ processed borosilicate.

Optical materials may also include polymers. Such polymers are typically those which are used on radomes. Such polymers include, but are not limited to, polyamides, epoxy resins, fiber-reinforced epoxy resins, chlorotrifluoroethylene, acrylic styrene acrylonitrile, acrylic styrene acrylonitrile polycarbonate blend, styrene acrylonitrile, styrene butadiene, and unplasticised polyvinyl chloride. Other polymers include, but are not limited to poly(methyl methacrylate, polycarbonate, polyimide, polyolefin and their fluorinated counterparts.

Graphene may be obtained commercially. Examples of commercial sources of graphene are Angstrom Materials, Dayton, Ohio, Vorbeck Materials, Jessup, Md. and XG Sciences, East Lansing, Mich. Alternatively, graphene may be produced by CVD using single crystalline or polycrystalline metal substrates. Suitable metals are metals which typically do not form carbides. Such metals include, but are not limited to, copper, platinum, iridium, ruthenium and nickel. The metal film substrate is heated to a temperature of 1000° C. or higher or such as from 1000° C. to 1050° C. in the presence of hydrogen gas or alternatively a combination of hydrogen gas and an inert gas such as argon for at least 5 minutes, or such as from 15-60 minutes, or such as from 20-40 minutes. The flow rates of hydrogen may vary with pressure and is at least 5 sccm and may be 250 sccm or more. The flow rate of argon may vary from 0 to 500 sccm and more. High flow rates are typically used at pressures of 100-760 torr. Minor experimentation may be used to determine desired flow rates of gases in relation to pressures. A source of carbon is then introduced into the chamber where graphene formation is to take place. Sources of carbon include, but are not limited to, methane gas, poly(methyl methacrylate), polystyrene, benzene, ethylene, acetylene and other hydrocarbons, such as but not limited to, ethane and propane. If the carbon source is a gas, flow rates may be from 30-100 sccm or such as 60-80 sccm. Growth pressures may range from 0.1-10 torr or such as from 0.5-6 torr. Typically graphene formation occurs over 10 minutes to 60 minutes, or such as from 15 minutes to 30 minutes. For solid carbon sources, such as poly(methyl methacrylate), polystyrene and other solid hydrocarbons, a conventional heating tape is applied to the metal foil and is heated to temperatures of 1000° C. or higher. The foil is cooled rapidly to room temperature under hydrogen, methane, and argon to preserve the graphene. Controlled cooling involves reduction in power to obtain a desired cooling rate until power is completely off. The furnace is then opened to atmosphere or an increase in the flow rate of gases is done. Typically, cooling is done by reducing the temperature from 5-20° C. per second or such as from 10-15° C. per second. The thickness of the graphene deposit may be controlled by modifying the growth pressure as well as the temperature and time at which it is deposited on the metal foil.

Optionally, graphene may be doped with one or more atoms, such as, but not limited to nitrogen, boron, phosphorus and astatine using sources such as $NH_3$, $NO_2$, $NF_3$, $B_2H_6$, $PH_3$ and $AsH_3$ to help tailor the sheet resistivity of the graphene to a desired range. The doping atoms may be incorporated into the graphene to provide doping levels of $1\times10^{12}$ $cm^{-2}$ and greater or such as $3\times10^{12}$ $cm^{-2}$ and greater or such as $1\times10^{12}$ $cm^{-2}$ to $5\times10^{12}$ $cm^{-2}$. The doping gases are added to the chamber during graphene formation. The partial pressures of the doping gases are from 5 torr to 50 torr. In general, the atmosphere in the chamber includes from 30% to 80% by volume of one or more of the doping agents in gaseous form. Mobility of the graphene layers produced by the doping is $2\times10^4$ $cm^{-2}V^{-1}s^{-1}$ and greater or such as $4\times10^4$ $cm^{-2}V^{-1}s^{-1}$ and greater or such as $2\times10^4$ $cm^{-2}V^{-i}s^{-1}$ to $6\times10^4$ cm-2$V^{-1}s^{-1}$.

Graphene may be joined to an optical material substrate by various methods, such as, but not limited to, spin-casting, curable liquid carriers, CVD, PVD, thermal release tape, evaporation such as molecular beam epitaxy (MBE) in ultra-high vacuum, or as an ink. When the graphene is applied to the substrate in a curable liquid carrier or as an ink it may be applied by methods, such as, but not, limited to, screen printing, inkjet, aerosole, spin-coating and doctor blade.

Spin-cast methods may use conventional spin-cast apparatus. The graphene may be combined with suitable molecules to promote adhesion and coating uniformity. Graphene solutions may be applied by spin-casting at rates of 1000-10,000 rpm or such as from 2000-5000 rpm. Thickness of the spun-cast layers may range from 1-50 nm or such as from 5-10 nm before curing. The graphene materials are typically diluted in organic solvents prior to spin-casting. Such organic solvents include, but are not limited to, anisole, alcohols, ethers, carbon tetrachloride, propylene glycol methyl ether (PGME), propylene glycol methyl ether acetate (PGMEA), ethyl lactate, dimethylsulfoxide, methyl ethyl ketone and 1-methyl-2-pyrrolidone. The solvent used may vary depending on the type of molecule included with the graphene. Such solvents and their ability to dilute or solubilize a given molecule are well known in the art. Molecules which may be spun-cast include, but are not limited to, surfactants such as cetyl alcohol, stearyl alcohol, polyethylene glycol, polyoxyethylene glycol octylphenol ethers, polyoxyethylene glycol alkylphenol ethers and block copolymers of polyethylene glycol and polypropylene glycol.

If the spun-cast cured polymer-graphene composite includes a metal film, the metal film is then removed from the cured polymer-graphene composite by applying oxygen plasma on the back-side of the metal film opposite the side which includes the cured polymer-graphene composite. This is followed by wet etching the metal foil to remove it from the cured polymer-graphene composite layers. Wet etching may be done using one or more inorganic acids at dilute concentrations. Such acids include, but are not limited to, nitric acid, hydrochloric acid, sulfuric acid and hydrofluoric acid. Typically the acids are applied at concentrations of 5 wt % to 20 wt %, more typically from 10 wt % to 15 wt %.

The cured polymer layer of the composite is then applied to a surface of the optical material with or without the use of pressure to obtain adhesion of the cured polymer-graphene composite to the optical material. If pressure is used, the amount applied is 1-5 psi. The polymer layer is then removed such that the graphene layer adheres to the surface of the optical material. The cured polymer layer may be removed either by annealing at temperatures sufficiently high to drive off the polymer layer while retaining the graphene, or by dissolving away the polymer layer with one or more solvents which dissolve the polymer layer while retaining the graphene. Annealing is done under hydrogen and argon at temperatures ranging from 300° C. to 900° C. or such as from 400° C. to 800° C. Annealing may be done over 60 minutes and greater, typically from 90 minutes to 12 hours. Solvents which may be used to dissolve the molecule layer without removing the graphene include, but are not limited to, ketones, such as acetone and methyl ethyl ketone, benzene, benzene derivatives, aldehydes, N,N-dimethylformamide (DMF), eethanol, tetrahydrofuran (THF), dimethylsulfoxide (DMSO), N-methyl-2-pyrrolidone (NMP) and acetonitrile. Removal of the cured polymer using one or more solvents may be done from room temperature to 70° C.

When graphene is applied to a surface of an optical material with thermal release tape, the thermal release tape is pressed on to a graphene film. The thermal release side is then applied on the optical material and heated to 80-130° C. If the graphene film is joined to a metal film, the metal film is first removed before heating by oxygen plasma and wet etching as described above. The thickness of the graphene films may be increased to any desired value by repeating this method. An example of a commercially available thermal release tape is REVALPHA™ from Nitto Denko.

Graphene may be applied to an optical material using one or more curable carrier liquids by dispersing one or more of graphene particles and flakes in the liquid. Such liquids include, but are not limited to, N,N-dimethylformamide (DMF), ethanol, tetrahydrofuran (THF), dimethylsulfoxide (DMSO), N-methyl-2-pyrrolidone (NMP) and acetonitrile. The particles or flakes of graphene are mixed with one or more of the curable liquids to provide a substantially uniform dispersion of flakes, particles or mixtures thereof. The dispersions may be applied to the optical material surface by methods such as, but not limited to, spraying, screen printing, ink jetting, doctor blading or spin-coating. Methods such as screen printing, aerosole and inkjet allow for selective applications of the graphene such that the graphene may be deposited as a pattern on the optical material substrate. Alternatively the dispersions may be selectively applied to the optical materials to form patterns on the surface of the material by using a mask. Such masks are well known in the imaging arts. They may be permanent masks or removable masks. Removable masks are typically wax based masks which may be peeled from the substrate or developed off of the substrate using an aqueous alkaline or acid developer or an organic solvent based developer. Typically organic solvent based developers are amine based and are alkaline. Curing may be done by thermo-curing or by photo-curing as described above. Alternatively the carrier may be a resin or polymer. Such resins include, but are not limited, to epoxy resins, polyamide resins and polyurethane resins. Mixtures of resins may also be used. The polymers include, but are not limited to, those described above used in spin-casting. Such curable carrier liquids, epoxy resins and polymers form layers on the surface of the optical material at thickness ranges of 500 μm to 10 mm or such as from 750 μm to 1 mm. Such thickness ranges allow for a sufficiently thin layer to avoid substantial blockage of visible and IR transmission.

Ink formulations include one or more waxes in combination with one or more of graphene flakes and particles. The graphene is blended with one or more waxes in weight to weight ratios of 1:5 to 1:50 or such as from 1:10 to 1:25 of graphene to wax. Waxes include, but are not limited to, natural waxes, chemically modified waxes and synthetic waxes. Natural waxes include, but are not limited to, carnuba wax, montan wax, vegetable waxes, fatty acid waxes. Synthetic waxes include, but are not limited to, paraffin waxes, microcrystalline polyethylene waxes, polypropylene waxes, polybutylene waxes, polyethylene acrylic waxes, polyester waxes and Fischer-Tropsch wax. Such wax formulations are typically applied by screen printing, doctor blade, aerosole or inkjet. Ink viscosities may range from 2,000 to 50,000 cP. An example of a commercially available inks are VORBECK™ inks. Conventional apparatus may be used. When inkjetting inks, typically, a piezoelectric inkjetting apparatus is used.

Physical vapor deposition, such as ion assisted e-beam deposition or sputtering may be used to apply a metal layer of 20 nm or less or such as from 0.5 nm to 15 nm on polished and cleaned surfaces of the optical material. Such optical materials include, but are not limited to, zinc sulfide, water clear zinc sulfide, zinc selenide, spinel, sapphire and aluminum oxynitride. Typically the optical materials are zinc sulfide, water clear zinc sulfide and zinc selenide. One or more metals may be deposited on the optical materials using conventional e-beam or sputtering methods. Parameters for depositing a metal by either method may vary depending on the metal deposited. Such parameters are well known in the art. The metals include metals which do not form carbides, such as copper, nickel, platinum, ruthenium, iridium and cobalt. Typically the metals are copper or nickel. After the metal is deposited on the optical material, it is annealed at 1000° C. and greater or such as from 1010-1050° C. Annealing is done in a hydrogen or hydrogen and inert gas atmosphere. The flow rate of hydrogen is from 50-150 sccm and inert gas is 0-350 sccm. Annealing is done for 10-30 minutes or such as from 15-25 minutes. Metals such as copper and nickel diffuse into the optical material, typically, zinc sulfide, water clear zinc sulfide and zinc selenide. Annealing produces single crystalline grains that have atomically flat terraces and steps which promote graphene growth. After annealing is completed, graphene films are produced by CVD deposition for 15-45 minutes using one or more hydrocarbon sources. As described above, the hydrocarbon source may be a gas, such as methane or may be a solid or liquid such as poly alkylacrylate, such as poly (methyl methacrylate), polystyrene, benzene, ethylene, acetylene or other hydrocarbon to provide a source of carbon for graphene growth. Typically the hydrocarbon source is a gas, such as methane, ethylene or acetylene. Flow rates of the gaseous hydrocarbons may be from 30-100 sccm or such as 60-80 sccm. Graphene growth pressures may range from 0.1-10 torr or such as from 0.5-6 torr. The graphene coated substrate is cooled at a rate of 5-20° C./second to a range of 600-900° C. under hydrogen, methane, and argon to preserve the graphene structure. Gas flow rates are substantially the same as during deposition of graphene. The rate of cooling controls the formation of multilayers of graphene. The optical material substrate is maintained at a temperature range of 600-900° C. for 24-100 hours, typically 40-80 hours to allow substantially all of the metal to diffuse into the optical material. The metal layer formed at or near the surface of the optical material ranges in thickness from 0.5-10 nm, or such as from 1-5 nm, the diffusion of the metals does not significantly increase the metal concentration in the substrate such as to compromise its electromagnetic radiation transmission properties. The graphene coated optical material substrate is then cooled to room temperature under hydrogen, methane, and argon to preserve the graphene. The thickness of the graphene may range from 1-20 layers or 0.4-8 nm or typically from 3-10 layers or 1-4 nm.

In another method, non-carbide forming metal foil substrate is heated in a furnace to at least 1000° C. or such as from 1010-1050° C. in the presence of hydrogen gas for 15-60 minutes or such as 20-40 minutes. Typically the foil is of copper or nickel. One or more hydrocarbon sources are provided as described above, typically, the hydrocarbon source is a gas. Flow rates of the gases may be from 30-100 sccm or such as 60-80 sccm. Growth pressures may range from 0.1-10 torr or such as from 0.5-6 torr. When graphene growth is completed, the composite of graphene and metal foil is cooled at a rate 5-20° C./second or such as 10-15° C./second to room temperature under hydrogen, methane, and argon to preserve the graphene. The graphene coated material is then mounted in the CVD chamber and optical materials are deposited on the graphene surface by the conventional CVD methods known in the art. Typically the optical materials are zinc sulfide, water clear zinc sulfide, zinc selenide or spinel. After sufficient thickness of 2 mm and greater is deposited on the graphene, the CVD process is terminated, the furnace is cooled down and the resultant laminate of optical material/graphene/metal is unloaded. The optical material surface is then generated, lapped and polished to produce an optical surface with scratch/dig of 80/50 or 40/20 or 20/10 using conventional machining and polishing methods well known in the art. The metal film is then removed by using conventional oxygen plasma wet etching with acids as described above. Alternatively, the metal film may be removed using conventional laser ablation or combinations of etching and laser ablation. The exposed graphene surface, optionally, may be coated with an antireflection layer or hard coating using conventional methods. Such coatings include, but are not limited to, alumina, diamond-like-carbon, diamond, or phosphides, such as boron and gallium phosphide. They may be applied using conventional physical vapor deposition processes, such as, but not limited to, ion assisted evaporation or microwave assisted magnetron sputtering. Typically such antireflection layers and hard coatings range in thickness from 1-3 μm, more typically 2-5 μm.

Graphene may also be dispersed in optical material or optical precursor material to form a composite. The optical particles are typically mono-disperse. The particles are provided in colloidal form, with graphene particles or flakes being dispersed in the colloid and dried. Typically the particles are from 0.5-5 μm in width or diameter and 7-10 layer thick, more typically 7-8 layers thick. In general the ratio of optical material to graphene is 40:1 to 100:1. The composite may be in the form or a brick or other shaped monolithic article. Optionally, the composite is subjected to elevated pressures and temperatures. Such processes may also be done under vacuum or under sintering conditions to form the monolithic article. Intensive processes such as hot isostatic pressing or Hipping may be used where pressures are 5000 psi and greater and temperatures are typically 1000° C. and greater. In order to enhance the dispersion of graphene within the optical material the graphene may be pre-coated with the optical material. Typically this is done by depositing the optical material on the graphene by conventional CVD and PVD methods.

Optionally, one or more layers of optical material may be deposited on the graphene to form a composite structure of optical material/graphene/optical material. The optical materials of the composite may be the same or different. In addition, the composite arrangement may be repeated forming multiple layers or optical material/graphene/optical material in one article. The optical material may be deposited on the graphene using one or more PVD and CVD methods well known in the art. The multiple graphene layers may be deposited on the optical material by one or more of the methods described above. The article may then be machined, lapped and polished using conventional methods. Antireflection layers or hard coatings may be deposited on the optical material as described above.

Graphene may also be used in combination with carbon nanotubes or metal nanowire, such as silver nanowire or combinations thereof to form multilayer conducting coatings for articles which selectively transmit IR and visible radiation while inhibiting radio frequency radiation. The article may include alternating layers of optical material, graphene, nanotubes or nanowire, or as an alternative the article may include alternating layers of optical material, graphene, nanotubes and nanowire. The layers may be in any order; however, typically the layers of optical material intervene between the layers of graphene, nanotubes or nanowire. The graphene may also be mixed with one or more of the nanotubes and nanowires to achieve a desired sheet resistance. The carbon nanotubes and nanowires may be in the form of a mat. The nanotubes may be prepared as disclosed in U.S. 2010/0079842. The different layers of the multilayer article may be modified in thickness and layer arrangement to achieve a desired sheet resistance and selective electromagnetic radiation. These articles may also be protected by applying hard coating of alumina by ion assisted evaporation or by microwave assisted magnetron sputtering processes. Other hard coatings may be diamond-like-carbon, boron phosphide, gallium phosphide and diamond.

In addition to selectively transmitting radiation in the IR and visible spectra and inhibiting incident radio frequency radiation, such as in the microwave band of 2-18 GHz, the graphene containing articles have increased electrical conductivity over many conventional articles having similar selective transmission properties. The graphene layers may yield a sheet resistance of 20 ohms/square or less or such as from 1-15 ohms/square with transmission @ 550 nm of 91% or greater. The relatively high electrical conductivity in the articles facilitates ice removal when they are operated in cold environments. The articles provide good electrical continuity between airframe and other surrounding structures. They also have reduced susceptibility to environmental damage. Graphene films have high thermal conductivity of around 5000 W/mK. Graphene also has high electron mobility of around 200,000 $V^{-1}$ $s^{-1}$ for good electrical conductivity, high frequency strength of around 125 GPa and an elastic modulus of around 1100 GPa. Accordingly, articles made with graphene layers near their surfaces or distributed throughout the articles can be used in high thermal shock environments to dissipate heat to the edges.

The following examples are intended to further illustrate the invention but are not intended to limits its scope.

EXAMPLE 1

Multiple samples of CLEARTRAN™ water clear zinc sulfide articles, obtainable from Rohm and Haas Electronic Materials, LLC, Marlborough, Mass., each 2.5 cm in diameter and 6 mm thick are prepared by grinding, lapping and polishing using conventional apparatus with alumina abrasive particles having average diameters in the range of 0.05-9 μm to scratch/dig of 80/50. The samples are then cleaned with reagent grade acetone and then with 70 wt % methyl alcohol.

Copper film substrates having a thickness of 1 mm are placed in a conventional physical vapor deposition furnace and heated to 1000° C. Methane gas is flowed into the furnace at 70 sccm for 15 minutes at a growth pressure of 0.5 torr to form graphene 4 layers thick on each copper film. The furnace is then cooled at a rate of 18° C./minute. When the graphene coated copper films reach room temperature, they are removed from the furnace.

Poly(methyl methacrylate), obtainable from MicroChem Corp, Newton, Mass., is diluted with anisole at a volume to volume ratio of 1:1 and spun-cast at 2500 rpm on the graphene layer of the copper films using a conventional spin-cast apparatus. A coating 0.1 mm thick is deposited on the graphene. The poly(methyl methacrylate) coated graphene and copper film substrates are placed in a conventional convection oven and heated at 130° C. for 5 minutes to adhere the graphene to the poly(methyl methacrylate). The substrates are removed from the oven and cooled to room temperature.

Each substrate is then placed under a fume hood and the copper is wet etched at room temperature with 10% nitric acid. After the copper films are etched away, the graphene-poly(methyl methacrylate) films are rinsed with water for 10 minutes, followed by 10 minutes in 10% hydrochloric solution and finally in water all at room temperature. The films are applied to the water clear zinc sulfide by hand-pressing the poly(methyl methacrylate) side of the film onto the water clear zinc sulfide articles. The coated articles are placed in a conventional convection oven and annealed at 450° C. for 90 minutes under flowing hydrogen gas to remove the poly(methyl methacrylate) and adhere the graphene to the water clear zinc sulfide. The articles are expected to transmit IR and visible radiation and inhibit microwave transmission in the range of 2-18 GHz.

EXAMPLE 2

Multiple samples of TUFTRAN™ laminate articles, obtainable from Rohm and Haas Electronic Materials, LLC, Marlborough, Mass., each 2.5 cm in diameter and 6 mm thick are prepared by grinding, lapping and polishing using conventional apparatus with alumina abrasive particles having diameters in the range of 9-0.05 μm to scratch/dig of 80/50. The samples are then cleaned with reagent grade acetone and then with 70 wt % methyl alcohol.

Copper film substrates having a thickness of 1 mm are placed in a conventional physical vapor deposition furnace and heated to 1000° C. Methane gas is flowed into the furnace at 70 sccm for 20 minutes at a growth pressure of 0.5 torr to form graphene 6 layers thick on each copper film. The furnace is then cooled at a rate of 18° C./minute. When the graphene coated copper films reach room temperature, they are removed from the furnace.

Poly(methyl methacrylate), obtainable from MicroChem Corp, Newton, Mass., is diluted with anisole at a volume to volume ratio of 1:1 and spun-cast at 2500 rpm on the graphene layer of the copper films using a conventional spin-cast apparatus. A coating 0.1 mm thick is deposited on the graphene. The poly(methyl methacrylate) coated graphene and copper film substrates are placed in a conventional convection oven and heated at 130° C. for 5 minutes to adhere the graphene to the poly(methyl methacrylate). The substrates are removed from the oven and cooled to room temperature.

Each substrate is then placed under a fume hood and the copper is wet etched at room temperature with 10% nitric acid. After the copper films are etched away, the graphene-poly(methyl methacrylate) films are rinsed with water for 10 minutes, followed by 10 minutes in 10% hydrochloric solution and finally in water all at room temperature. The films are applied to the laminate by hand-pressing the poly(methyl methacrylate) side of the film onto the laminate. The coated articles are placed in a conventional convection oven and annealed at 450° C. for 90 minutes under flowing hydrogen gas to remove the poly(methyl methacrylate) and adhere the graphene to the laminate. The articles are expected to transmit IR and visible radiation and inhibit microwave transmission in the range of 2-18 GHz.

EXAMPLE 3

Graphene 6 layers thick are formed on a CVD Zinc Selenide™ article 2.5 cm in diameter and 6 mm thick by the same method as described in Example 2. The graphene coated article is placed in a conventional CVD chamber and zinc metal is placed in the retort of the CVD chamber and the thermostat of the retort is raised to 575° C. The chamber is pumped down to vacuum and heated to 300° C. Argon gas is flowed into the chamber at 113 slpm while the temperature in the chamber is raised to 600° C. Hydrogen sulfide gas is then introduced into the chamber at 9 slpm and a flow of hydrogen sulfide and argon is continued for 12 hours. The chamber temperature is then raised to 690° C. with pressures within the range of 40 to 60 torr. The temperature in the retort is raised from 575° C. to 660° C. and zinc metal vapor is generated at a target flow rate of 12 slpm. The flow of hydrogen sulfide and argon is maintained. Zinc sulfide is then deposited on the graphene layer of the CVD Zinc Selenide™ over a period of 6 hours to form a deposit on the graphene layer 3 mm thick. The temperature of the graphene coated article is maintained from 670° C. to 700° C. during deposition. After deposition is complete the temperature of the chamber is ramped down over 12 hours and the coated article is removed from the chamber. The CVD ZincSelenide™/graphene/zinc sulfide laminate is lapped and polished using conventional lapping apparatus and polishing pads with alumina abrasive particles having diameters in the range of 9-0.05 μm to scratch/dig of 80/50. No delamination of the layers is expected. The articles are expected to transmit IR and visible radiation and inhibit microwave transmission in the range of 2-18 GHz.

EXAMPLE 4

Powdered spinel is cast by suspending the powder in water with conventional amounts of dispersants, surfactants and binders and pouring it into a hard rubber mold to form a 10 cm×10 cm×3 cm brick. The brick is sintered at 950° C. in a conventional sintering oven. The sintered spinel is then processed in a hot-isostatic press known as Hipping for 2 hours at 1650° C. with pressures at around 15,000 psi. After the Hipping process is complete the press is cooled at a rate of 50° C. per hour and the pressure is reduced to atmospheric. The Hipped brick is removed from the press. The brick is prepared by grinding, lapping and polishing to scratch/dig of 80/50 using a mixture of diamond particles having average diameters of 0.5 μm to 1 μm. The brick is then cleaned with reagent grade acetone and then with 70 wt % methyl alcohol.

Graphene flakes are mixed with a sufficient amount of reagent grade ethanol to solubilize the graphene. The solution is then blended with CARBOWAX™ mixture of polyethylene glycols and methoxypropylene glycols at a weight to weight ratio of 1:2 to form an ink with a viscosity of 10,000 cP. A steel mesh is placed on one side of the polished spinel brick and the graphene ink is applied with a doctor blade to a thickness of 1 mm. The graphene coated spinel is placed in a conventional annealing furnace and annealed in an inert atmosphere of argon gas at a temperature of 900° C. for 1 hour. The furnace is cooled down at a rate of 30° C. per hour. After cooling the surface resistivity of the annealed graphene coated spinel is measured using a conventional 4-probe method such as ASTM F1529. The sheet resistance of the graphene is expected to be 1-5 ohms/square.

EXAMPLE 5

Spinel having a theoretical density of at least 90% is produced by a reaction mixture of $AlCl_3$ and $MgCl_2$ vapors with $CO_2$ and $H_2$ on a heated quartz mandrel in a conventional CVD furnace. The CVD furnace is made of a quartz tube with a secondary quartz liner tube inside of the main tube. Two graphite retorts are mounted inside the main tube and are used to contain Al and $MgCl_2$. $AlCl_3$ is produced by reacting solid aluminum with HCl gas at a temperature of 600° C. A mixture of HCl and $N_2$ is passed through the Al retort to carry the $AlCl_3$ to the reaction area. $MgCl_2$ gas is produced by sublimating $MgCl_2$ solid at 850° C. Nitrogen is passed through the $MgCl_2$ retort to carry $MgCl_2$ vapors to the reaction area. A mixture of $CO_2$, $H_2$ and $N_2$ is passed through the central injector connected to the reaction zone.

The mandrel temperature is controlled at 1000° C. and the furnace pressure is kept at pressures of 50 and 100 torr. The flow rates of the reagents are as follows:

TABLE

| REAGENT | FLOW RATE |
|---|---|
| Nitrogen at Aluminum retort | 0.5 slpm |
| Nitrogen at Magnesium chloride retort | 0.6-0.8 slpm |
| Nitrogen with $CO_2$ | 0.5 slpm |
| HCl | 0.10-0.15 slpm |

TABLE-continued

| REAGENT | FLOW RATE |
|---|---|
| Carbon dioxide | 1-1.5 slpm |
| $H_2$ | 2-3 slpm |

The deposition is performed on four quartz mandrels which are arranged in the form of an open box inside the liner tube. Some of the mandrels are coated with mold release coatings. Each deposition is performed for 8 hours. After the deposition, a uniform coating of spinel is observed on the inlet flange and mandrels The dense CVD spinels are then machined by grinding, lapping and polishing to scratch/dig of 80/50 using a mixture of diamond particles having average diameters of 0.5 μm to 1 μm. The spinels are then cleaned with reagent grade acetone and then with 70 wt % methyl alcohol.

Graphene 10 layers thick are prepared on copper films according to the method described in Example 1 except that graphene deposition time is increased to 25 minutes. Poly (methyl methacrylate) is diluted with anisole at a volume to volume ratio of 1:1 and spun-cast on the graphene layer of the copper films using a conventional spin-cast apparatus. A coating 0.1 mm thick is deposited on the graphene. The poly(methyl methacrylate) coated graphene and copper film substrates are placed in a conventional convection oven and heated at 130° C. for 5 minutes to adhere the graphene to the poly(methyl methacrylate). The substrates are removed from the oven and cooled to room temperature.

Each substrate is then placed under a fume hood and the copper is wet etched at room temperature with 10% nitric acid. After the copper films are etched away, the graphene-poly(methyl methacrylate) films are rinsed with water for 10 minutes, followed by 10 minutes in 10% hydrochloric solution and finally in water all at room temperature. The films are applied to the spinels by hand-pressing the poly (methyl methacrylate) side of the film onto the spinels. The coated spinels are placed in a conventional convection oven and annealed at 450° C. for 90 minutes under flowing hydrogen gas to remove the poly(methyl methacrylate) and adhere the graphene to the spinels. The spinels are expected to transmit IR and visible radiation and inhibit microwave transmission in the range of 2-18 GHz. The sheet resistance of the graphene coating is expected to be less than 5 ohms/square.

EXAMPLE 6

A theoretically dense spinel window is prepared and then coated with a graphene layer according to the method of Example 5. The graphene coated window is placed in a conventional CVD chamber and zinc metal is placed in the retort of the CVD chamber and the thermostat of the retort is raised to 575° C. The chamber is pumped down to vacuum and heated to 300° C. Argon gas is flowed into the chamber at 114 slpm while the temperature in the chamber is raised to 600° C. Hydrogen sulfide gas is then introduced into the chamber at 10 slpm and a flow of hydrogen sulfide and argon is continued for 12 hours. The chamber temperature is then raised to 690° C. with pressures within the range of 50 to 60 torr. The temperature in the retort is raised from 575° C. to 670° C. and zinc metal vapor is generated at a target flow rate of 13 slpm. The flow of hydrogen sulfide and argon is maintained. Zinc sulfide is then deposited on the graphene layer of the spinel window over a period of 10 hours to form a deposit on the graphene layer 4 mm thick. The temperature of the graphene coated window is maintained from 690° C. to 700° C. during deposition. After deposition is complete the temperature of the chamber is ramped down over 12 hours and the coated window is removed from the chamber. The CVD spinel/graphene/zinc sulfide laminate is lapped and polished using conventional lapping apparatus and polishing pads with alumina abrasive particles having average diameters in the range of 0.05-9 μm to scratch/dig of 80/50. No delamination of the layers is expected. The window is expected to transmit IR and visible radiation and inhibit microwave transmission in the range of 2-18 GHz. The sheet resistance of the window is expected to be less than 10 ohms/square.

EXAMPLE 7

A Techspec® Sapphire window is obtained from Edmund Scientific. Graphene is formed and then applied to one side of the window according to the method in Example 2. The sapphire windows are expected to transmit IR and visible radiation and inhibit microwave transmission in the range of 2-18 GHz. The sheet resistance of the window is expected to be less than 20 ohms/square.

EXAMPLE 8

An ALON™ aluminum oxynitride window is obtained from Surmet of Burlington, Mass. The window is prepared by grinding, lapping and polishing to scratch/dig of 80/50 using conventional machining apparatus and polishing pads with a mixture of alumina particles having average particle diameters in the range of 0.05-9 μm. The window is then cleaned with reagent grade acetone and then with 70 wt % methyl alcohol. A brass mesh is placed on the window and graphene ink containing graphene flakes solubilized in a sufficient amount of ethanol and then blended with paraffin wax in a weight to weight ratio of 1:3 is applied with a doctor blade. The viscosity of the ink is 20,000 cP.

The coated window is placed in a conventional annealing furnace and annealed in an inert atmosphere of argon gas at a temperature of 900° C. for 1 hour. The furnace is cooled down at a rate of 40° C. per hour. After cooling the surface resistivity of the annealed graphene coated aluminum oxynitride window is measured. The sheet resistance of the window is expected to be 1-5 ohms/square.

EXAMPLE 9

Powdered zinc sulfide is prepared by dissolving $ZnCl_2$ in water and treating the solution with gaseous $H_2S$ at 70° C. under an enclosed temperature regulated fume hood. Zinc sulfide is precipitated out and is collected by filtration and washed to substantially remove residual chloride ions. The zinc sulfide powder and graphene particles having an average diameter of 10 μm are blended in 98:2 weight to weight ratio. The mixture is then dispersed in water and treated with ultrasonic energy using a 100 W, 30 kHz UP100H laboratory ultrasonic device for 5 minutes at room temperature. The powder is allowed to flocculate and pressed into 10 cm×10 cm×3 cm bricks.

The bricks are heated in a conventional sintering furnace under vacuum to 430° C. for 2 hours. The temperature of the furnace is then raised to 600° C. Hydrogen sulfide gas is then introduced into the chamber at 10 slpm for 2 hours. The furnace is cooled down over 4 hours and the sintered bricks are removed.

Each sintered zinc sulfide bricks is completely wrapped in two platinum sheets. The wrapped bricks are placed in a graphite crucible by placing them side by side vertically. The crucible containing the wrapped bricks is HIPped in a conventional HIP furnace at a temperature of 1000° C. and at a pressure of 15 Ksi for 90 hours in an argon environment. After HIPping the crucible is cooled slowly at a rate of 30° C./hour to 60° C./hour. When the wrapped bricks cool to room temperature, they are removed from the furnace and are unwrapped. They are then generated, lapped and polished using a Blanchard grinder with diamond particles having an average diameter of 3-6 μm and a Pellon Pad™ lapping pad with diamond paste having particles of average diameters of 0.5 μm to 2 μm to evaluation polish of scratch/dig=120/80. The zinc sulfide and graphene bricks are expected to have a sheet resistance of less than 20 ohms/square and be able to transmit IR and visible radiation while inhibiting incident microwave bands.

EXAMPLE 10

Samples of CVD ZINC SULFIDE™ zinc sulfide articles each 2.5 cm in diameter and 6 mm thick are prepared by grinding, lapping and polishing using a Blanchard grinder with diamond particles having an average diameter of 3-6 μm and a Pellon Pad™ lapping pad with diamond paste having particles of average diameters of 0.5 μm to 2 μm to scratch/dig of 80/50. The samples are cleaned with reagent grade acetone and then with 70 wt % methyl alcohol.

Graphene flakes are mixed with dimethylformamide and water in weight ratios of 1:90:9 to form a uniform dispersion of graphene flakes. Mixing is done using a 100 W, 30 kHz SonoStep ultrasonic mixing device. The dispersion is sprayed onto the surface of the zinc sulfide articles using a conventional spraying apparatus. The dispersion is dried at room temperature to form a graphene coating on the zinc sulfide 0.5 mm thick. The coated articles are placed in a furnace and annealed at 150° C. under vacuum for 6 hours. A protective coating of ZnS 100 μm thick is applied on the graphene layer through a conventional e-beam evaporative process. The articles are expected to selectively transmit IR and visible radiation while inhibiting incident microwave radiation.

EXAMPLE 11

Plexiglas™ poly(methyl methacrylate) sheets are obtained from Arkema. A dispersion of graphene particles is mixed in 20% ethanol to form a uniform dispersion. Graphene is applied to the poly(methyl methacrylate) sheets by spin-coating at 2500 rpm to form graphene 4 layers thick. The coated sheets are placed in a furnace and annealed at 90° C. for 10 hours.

EXAMPLE 12

A CLEARTRAN™ water clear zinc sulfide article is treated with graphene on one surface, as described in Example 2 except that the graphene deposition time is increased to 30 minutes. The article is placed in a CVD furnace and zinc metal is placed in the retort of the furnace. The temperature of the retort is raised to 575° C. The furnace is pumped down to vacuum and heated to 300° C. Argon gas is flowed into the furnace at a rate of 113 slpm while the temperature in the chamber is raised to 600° C. Hydrogen sulfide gas is then introduced into the chamber at a rate of 10 slpm and both argon and hydrogen sulfide continue to flow for 12 hours. The chamber temperature is raised to 690° C. and the retort containing the zinc metal is raised from 575° C. to 700° C. to generate a flow of zinc metal vapor. The flow of hydrogen sulfide gas is maintained at 10 slpm. Zinc sulfide is deposited on the graphene to a thickness of 1 mm over 6 hours. The resulting zinc sulfide/graphene/water clear zinc sulfide laminate is machined and polished to scratch dig 80/50 without delaminating of the layers.

The uncoated surface of water clear zinc sulfide is coated with a layer of graphene 0.5 mm thick as in Example 2. This article is placed in a CVD furnace along with zinc metal and coated with a layer of Zinc sulfide as described above. The resultant article of zinc sulfide/graphene/water clear zinc sulfide/graphene/zinc sulfide laminate is polished to a scratch dig of 80/50 without delaminating of the layers of multiple embedded conductive coatings. The article is expected to selectively transmit IR and visible radiation while inhibiting incident microwave radiation. The sheet resistance of the articles is expected to be less than 20 ohms/square.

EXAMPLE 13

Copper films 2.5 cm in diameter and 3 mm thick from Alfa Aesar, Ward Hill, Mass., are machined by grinding, lapping and polishing to a surface roughness of less than 20 angstroms RMS using a Blanchard grinder, Pellon Pad™ lapping pads and diamond abrasive particles having average diameters of 0.5 μm to 2 μm. The films are heated to 1000° C. under an argon atmosphere for 20 minutes to increase grain size and make the surfaces of each film smooth.

The copper films are then placed in a conventional CVD furnace to form graphene. Graphene layers are grown on the copper films by heating them to 1000° C. and flowing methane gas at 60 sccm over the films for 30 minutes at a growth pressure of 1 torr. Cooling is done at a rate of 10° C./minute. Graphene 12 layers thick are formed on each copper film.

The graphene coated copper films are mounted in a CVD furnace along with zinc metal in a retort with graphene facing the flow. The chamber is pumped down to vacuum and heated to about 300° C. Argon is flowed into the furnace at 114 slpm, while the temperature in the chamber is raised to 600° C. Hydrogen selenide gas is introduced into the furnace at a flow rate of 12 slpm. Both hydrogen selenide and argon are flowed for 12 hours. The furnace temperature is raised to 740-760° C. and zinc metal vapor begins to flow, while the flow of hydrogen selenide is continued. Zinc selenide is deposited on the graphene to a thickness of 1 mm. The resulting copper/graphene/zinc selenide laminates are fabricated and polished to a scratch/dig of 80/50 without delaminating the layers. Copper is then removed by etching it with 10% nitric acid solution. The articles are expected to selectively transmit IR and visible radiation while inhibiting incident microwave radiation. The sheet resistance of the articles is expected to be below 20 ohms/square.

What is claimed is:

1. An article that transmits in the infrared and visible regions of the electromagnetic spectrum and inhibits incident radio frequency radiation, the article consists of one or more film layers of graphene alternating with one or more layers of optical material chosen from zinc selenide and aluminum oxynitride, the one or more film layers of graphene are doped with one or more doping agents chosen from nitrogen, boron, phosphorus and astatine, wherein the one or more doping agents are incorporated into the graphene, the one or more film layers of graphene yield a sheet resistance of 20 ohms/square or less with transmission @ 550 nm of 91% or greater.

2. The article of claim 1, wherein doping level is $1\times10^{12}$ $cm^{-2}$ and greater.

3. The article of claim 1, wherein mobility of the one or more graphene layers is $2\times10^{4}$ $cm^{-2}V^{-1}s^{-1}$ and greater.

4. The article of claim 1, wherein the sheet resistance is from 1-15 ohms/square.

5. The article of claim 1, wherein a thickness of the one or more film layers of graphene is 0.4-8 nm.

6. The article of claim 5, wherein the thickness of the one or more film layers of graphene is 1-4 nm.

7. The article of claim 1, wherein the article inhibits radio frequency radiation in a microwave band of 2-18 GHz.

8. The article of claim 1, wherein the one or more optical layers of optical material is chosen from aluminum oxynitride.

* * * * *